J. L. Knick.
Weeding Implement.
Nº 77,385.   Patented Apr. 28, 1868.
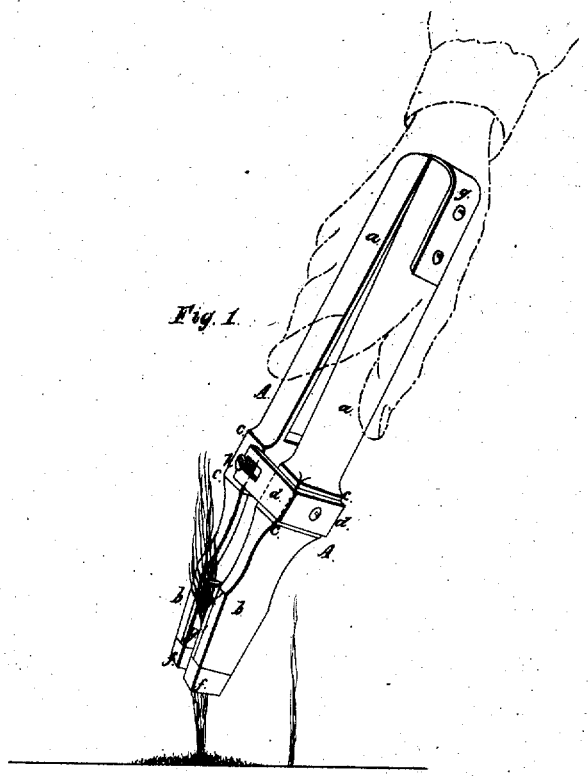
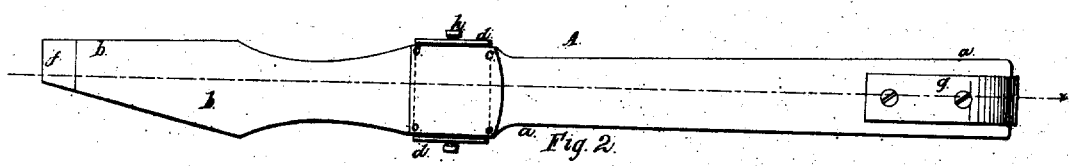
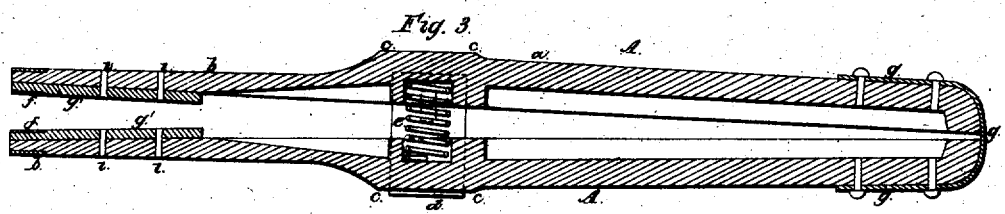
Witnesses:   Inventor:

United States Patent Office.

JAMES L. KNICK, OF LEXINGTON, ILLINOIS.

Letters Patent No. 77,885, dated April 28, 1868.

IMPROVED IMPLEMENT FOR EXTRACTING HEDGE-PLANTS AND WEEDS.

The Schedule referred to in these Letters Patent and making part of the same.

TO ALL WHOM IT MAY CONCERN:

Be it known that I, JAMES L. KNICK, of Lexington, in the county of McLean, and State of Illinois, have invented a new and improved Instrument for Extracting Hedge-Plants and Weeds; and I do hereby declare that the following is a full, clear, and exact description thereof, reference being had to the accompanying drawings, making a part of this specification, in which—

Figure 1 is a perspective view of the improved instrument.

Figure 2 is a side view of the same.

Figure 3 is a longitudinal sectional view.

Similar letters of reference indicate corresponding parts in the several figures.

This invention relates to a new and improved instrument which is designed for the use of gardeners and nurserymen, in the operation of extracting young hedge-plants from the ground for replanting, and also for thinning out plan and remaining weeds from them.

The object of the invention is to so construct an instrument for said purposes, that while a firm gripe can be obtained upon the stem of a plant near its root, the bark will not be bruised nor injured in the act of extracting the plant from the ground. To this end, the nature of my invention consists in suitably pivoting or hinging together two bars, which are so constructed as to form a handle, and also two griping-jaws, and in interposing between these bars a spring which will keep their jaws separated, except when forcibly pressed together by the hand, said jaw-portions being lined or covered upon their griping sides with a yielding or elastic substance, which will protect the stems of plants during the act of extracting them from the ground, as will be hereinafter described.

To enable others skilled in the art to understand my invention, I will describe its construction and operation.

In the accompanying drawings, A A represent two bars, which may be made entirely of metal, or, if desirable, they may be made of a suitably strong wood, strengthened with metal. I prefer to construct the bars of metal, of the form substantially as shown in the drawings, so that they can be separately cast, and afterward united, as will be hereinafter shown. The long handle-portions $a$ $a$ of these bars are of a semi-cylindrical shape in cross-section, and are made hollow for affording lightness. These handle-portions are constructed with flat jaws $b$ $b$ upon them, of the form represented in fig. 1, or of any other suitable form. Between the jaws and handle-portions are rectangular enlargements $c$ $c$, which are embraced externally by a strap, $d$, for preventing the jaws from separating too much, and upon the inside of the bars at said points, recesses are formed for receiving a helical spring, $e$, which will press the jaws apart. The ends of the handle-portions $a$ $a$ farthest from the jaws $b$ $b$, are connected together by a strap, $g$, made of suitable spring-metal, which is bent around the extremities of the handle-portions, and secured fast thereto by means of screws, as shown.

The metal strap $d$, which embraces the rectangular portions $c$ $c$ at the point where the spring $e$ is applied, and which prevents this spring from forcing the jaws too far apart, is secured fast to one of the bars $a$, and its two ends are extended over the sides of the opposite bar, and slotted, so as to receive pins $h$ through said ends. The slots and pins limit the spreading movement of the jaws, but allow them to be pressed closely together. It will be seen by reference to fig. 3, that the inner faces of the jaws $b$ $b$ come together parallel, and that these faces are formed of a material, $g'$ $g'$, which is different from that of which the jaws are made, which material is secured in place by means of pins $i$ $i$, and ferrules $f$ $f$. I prefer to line the jaws with India rubber, but any other substance which will answer the purpose may be adopted. I use rubber because of its yielding and elastic properties, and because it is more durable than any other substances possessing those properties in like degree.

To use the instrument, its handle is grasped by one or both hands, and the jaws are made to gripe the stem of a plant with more or less force, according to the size and strength of the plant. Sufficient force is then applied to draw the plant straight up out of the ground. The hands are then relaxed, when the spring $e$ will force the jaws apart ready to receive another plant. The rubber lining $g$ $g$ being firmly secured to the jaws, will allow the stems of plants to be embedded into it, and will hold the stems so firmly that the instrument cannot slip, and consequently, with very little care, plants can be safely and with great facility extracted from the ground with such instrument.

When the instrument is to be used for weeds alone, the inner griping-faces of the jaws $b\ b$ need not be covered with rubber, but, instead thereof, they may be serrated, for, in extracting weeds, it is unimportant whether their stems be bruised or not.

Having described my invention, what I claim as new, and desire to secure by Letters Patent, is—

1. An instrument which is adapted for the extraction of plants and weeds, consisting of handle-portions $a\ a$ and jaws $b\ b$, united together by a spring-strap, $g$, and provided with a slotted strap, $d$, and spring $e$, substantially as described.

2. In such an instrument, I also claim the elastic lining $g'\ g'$, applied to the jaws $b\ b$, substantially as described.

JAMES L. KNICK.

Witnesses:
JAMES WELLS,
WILLIAM H. KENNEDY.